April 12, 1932.　　　W. S. YARROW　　　1,854,011

PROCESSING PLANT

Filed Nov. 22, 1930　　2 Sheets-Sheet 1

Inventor: W. S. YARROW
Per: Sydney E. Page
Attorney

April 12, 1932.  W. S. YARROW  1,854,011
PROCESSING PLANT
Filed Nov. 22, 1930  2 Sheets-Sheet 2

INVENTOR:—
W. S. YARROW
PER:— Sydney R. Page.
ATTORNEY.

Patented Apr. 12, 1932

1,854,011

UNITED STATES PATENT OFFICE

WILLIAM SYDNEY YARROW, OF HARROW, ENGLAND

PROCESSING PLANT

Application filed November 22, 1930, Serial No. 497,564, and in Great Britain October 23, 1930.

This invention relates to a processing plant.

In specification No. 429,415, now Patent 1,826,036, dated October 6, 1931, a processing plant is described and claimed which includes a closed cylindrical chamber and a revolving drum in the chamber carrying a plurality of channels parallel with the axis thereof located between the drum and the chamber, and is characterized by a plurality of spaced ribs, preferably perforated, carried by the chamber arranged to intersect the channels thereby forming a successive series of cages along the drum, the ribs being cut away to leave one channel running through the chamber connecting the several series of cages, said channel being in alignment with an inlet and an outlet for the chamber, means for rotating the drum step by step corresponding to the spacing of the cages around the drum whereby at each step the drum is brought to rest and an article may be fed through the inlet into the channel, the articles in the cages in the channel each displaced to the cage in the next respective series and the article in the cage in the channel in the last series discharged.

In the aforesaid patents there is also described and claimed intermittently actuated means operating when the drum is at rest for conveying each of the articles in the channel to the cage of the next respective series in the channel and for feeding a new article to the channel and for discharging the article in the cage of the channel of the last series.

The aforesaid patent also describes and claims a construction in which the conveying member is provided with prongs spaced according to the locating ribs of the chamber for simultaneously engaging each of the articles in the channel to laterally displace the articles to the cage of the next series, and causing the article in the last series to be discharged.

The object of the present invention is to provide an improved and simplified form of apparatus for conveying the articles through the chamber which eliminates the necessity of separately synchronized operating parts for feeding the articles into the chamber.

The present invention is an improvement in or modification of the invention disclosed in Patent 1,826,036, and consists in constructing the conveying member in the form of an endless conveyor, the conveyor being associated with feeding and discharge boxes whereby the conveyor actually feeds, passages and discharges the articles to, through and from the chamber respectively.

In preferred constructions the boxes may be partitioned into two compartments, and arranged so that the lower compartment of one is in the same plane as the upper compartment of the other, such compartment housing sprockets for the conveyor drive, the other compartment of each being provided with wheels connected for rotation with respective sprockets and each including spokes between which articles are lodged; the partitions between the compartments of each box being provided with openings whereby articles are transferred to and from the conveyor without loss of atmosphere from the chamber.

In order that the invention may be clearly understood reference will now be made to the accompanying drawings which show by way of example a preferred embodiment:

In the drawings like reference numerals designate the same or similar parts and for simplicity of description and understanding of the invention reference letters are employed for the chamber and parts thereof which were employed to designate the similar parts in the aforementioned patent.

Figure 1:
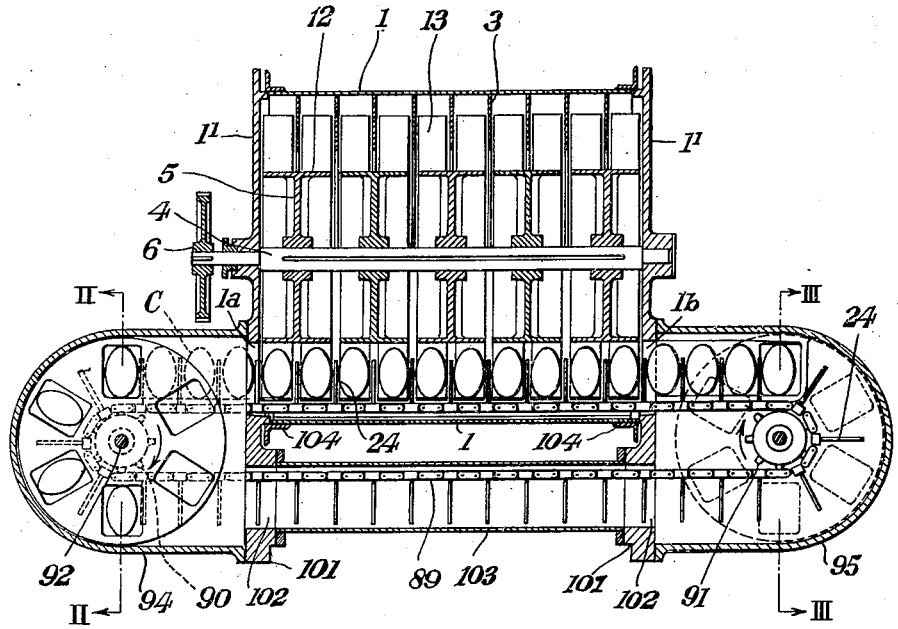
Fig. 1 is a central sectional plan, somewhat diagrammatically showing the endless conveyor and the boxes associated therewith for feeding and discharging the articles to and from the chamber.

Referring to the drawings, the closed chamber 1 carries on the shaft 4 a plurality of wheel members 5 which are keyed thereto, and provided at intervals on the rims 12 with brackets 13 spaced apart for the reception between them of articles to be treated in the chamber.

The brackets 13 are in transverse alignment and form channels extending from end to end of the chamber, the channels being intersected by the ribs 3 carried by the wall of the chamber, thereby forming with the brackets 13 and the rims 12 a series of cages around the periphery of the wheels 5. The shaft 4 is provided at one extremity with the tooth wheel 6 which is driven by any desired form of intermittent drive, for instance, by Geneva stop mechanism of the form shown in Fig. 4.

This mechanism comprises a slotted gear 10 on a shaft 10a and fixedly connected to a gear wheel 9 which, through an intermediate gear wheel 7 imparts the drive to the wheel 6. The slotted gear 10 is driven from a continuously rotating shaft M through bevels 62, by means of a pin roll 11, on a shaft 11a the pin roll 11 engaging the slots of the gear 10 and imparting step by step motion thereto in the well known manner.

Figure 4:
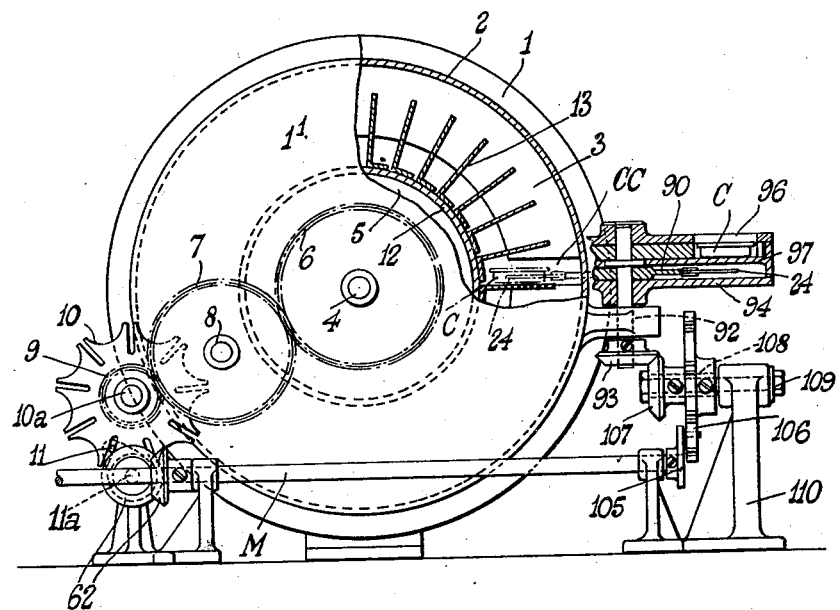
Fig. 4 is a part sectional end elevation to an enlarged scale of Fig. 1 showing the Geneva stop mechanisms driving the conveyor and the drum respectively, a part of the end casing and a part of the inlet box being cut away to show the channel through the ribs.

The implement for passaging the articles through the chamber and including the prongs 24 is in the construction shown a chain conveyor 89, the prongs being spaced apart equivalent to the spacing of the ribs 3 which in the path of the conveyor are cut away as shown in Fig. 4 to make a continuous channel CC through the chamber and a path for the prongs on the conveyor, this path containing openings 1a and 1b in the end walls 1' of the chamber as shown in Fig. 1.

In the construction shown the opening 1a is the opening through which the cans C are fed and the opening 1b is the opening through which the cans are discharged.

The endless conveyor passes around sprocket wheels 90, 91, of which the former may be the driver.

Figure 2:
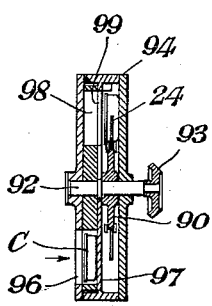
Fig. 2 is a sectional elevation on the lines II—II of Fig. 1 showing the inlet lock construction involved in the feeding box.
Figure 3:
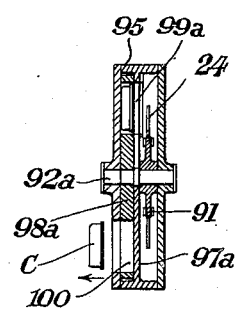
Fig. 3 is a similar view taken on the line III—III of Fig. 1 showing the lock construction in the discharge box.

To this end there is fixed on the spindle 92 of the driving sprocket 90 a bevel gear 93, see Figs. 2 and 4, which is driven synchronously with the gear wheel 6 which drives the wheels 5 in the chamber, that is to say, that the conveyor 89 is moved by the driving sprocket 90 when the driving wheel 6 of the wheels 5 is at rest, and when the wheel 6 is moving the drum constituted by the wheels 5 through a step movement the wheel 93 is at rest.

Conveniently the bevel 93 is intermittently driven by means of a second Geneva stop mechanism constituted by a slotted gear 106 driven by a pin roll 105 on the continuously rotating shaft M, and a bevel 107 gearing with the bevel 93, the gear 106 and the bevel 107 being mounted on a sleeve 108 carried on a spigot 109 mounted on a support 110. This second Geneva mechanism is set with regard to the first Geneva stop mechanism driving the wheel 6 so that the slotted wheel of the one mechanism is moving while the other is stationary and vice versa.

The step movement applied to the conveyor is equivalent to the spacing between the brackets 13 so that between consecutive movements of the drum a channel is in register with the inlet and outlet openings 1a, 1b, and a can C can be moved from the space between two ribs to the next space.

In the construction shown in the drawings, the conveyor not only passages cans through the chamber 1 and discharges a can at the same time through outlet opening 1b but it also feeds a can at the same time into the chamber through inlet opening 1a.

To this end the sprocket wheels 90 and 91 are housed in boxes 94 and 95 respectively, the box 94 having a feeding opening 96 to which the cans are conveyed by hand or by mechanical means such as a chute or conveyor. They then fall onto a partition member 97 which divides the box into two parts. Below the partition 97 is the sprocket 90 and above is a wheel member 98 having spaces between its spokes sufficiently large to receive the cans.

The wheel 98 is fixed to the spindle 92 of the sprocket 90 so that it turns with the sprocket, hence a can placed through the inlet 96 into the wheel member 98 is carried step by step through the box. The partition 97 has an opening 99 which connects the compartments on each side of the partition so that the can on reaching the opening 99 falls into the lower compartment and between prongs 24 of the conveyor. Thereafter it is taken by the conveyor from the box into the chamber in step by step movements.

The can having passed through the chamber is carried by the conveyor into the discharge box 95 at the other end which is similarly divided into two compartments by a partition 97a.

It will be noted that the wheel 98 is of such a thickness that it is snugly received in its respective compartment and accordingly each of the spokes acts as a closure to any communication between the chamber and outside atmosphere.

The can arrives on the conveyor in the upper compartment of the box 95 in which there is a sprocket 91 above the partition 97a which compartment is level with the lower compartment of the box 94 and is carried round the compartment until it arrives above the opening 99a in the partition 97a. Then it falls into the lower compartment in which is a wheel 98a similar to the wheel 98 being fixed to the spindle 92a carrying sprocket 91 which then carries on the can to the discharge opening 100 through which the can falls and may be taken away by a chute or conveyor.

By such constructions the cans are by mechanical means continuously fed to, passaged through and discharged from the chamber, the construction being such that there is no loss of the atmosphere therein, the boxes 94, 95 forming efficient inlet and discharge locks which prevent the egress of the atmosphere during feeding and discharging operations.

In the construction illustrated the boxes 94, 95, are secured to the end walls 1' and to plate extensions 101, the extensions having openings 102 for the passage of the conveyor chain 89 and the arms 24 thereon.

In order that the conveyor may move in an entirely closed space, the apertures 102 are connected by a tubular member 103.

Bracket members 104 may be interposed between the wall 1 of the chamber and the end plates 101 to strengthen the structure.

What I claim is:—

1. Apparatus for processing articles including a closed chamber, a drum in the chamber, channels formed on the periphery of the drum and longitudinally thereof, ribs formed on the body of the chamber intersecting said channel thereby forming a successive series of cages along the drum of a size to receive articles to be processed, said ribs being cut away to form a through channel in the chamber the end walls of the chamber being cut away to provide openings registering with said channel, a conveying member in the form of an endless conveyor disposed for operation by said through channel and in said openings in the end walls, arms on said conveyor extending into said through channel and in spaced relation corresponding to the spacing of the ribs, means for operating said conveyor intermittently and alternately with the movements of the drum, and a box associated with the conveyor at the opening at one end wall, a partition in said box forming on one side thereof a housing for the conveyor and at the other side thereof a lock for the reception of articles to be delivered to the conveyor, said lock including a rotatable member and said partition being provided with an opening connecting the lock and housing whereby articles are fed through the lock through the partition to the conveyor and introduced by the conveyor into the chamber.

2. In combination a closed processing chamber, a drum rotatably mounted therein, a series of channels longitudinally thereof, ribs formed on the chamber intersecting all but one of the channels thereby leaving one through channel, an endless conveyor, arms on said conveyor operating in said through channel in spaced relation corresponding to the spacing to said ribs, an inlet lock to said chamber, a discharge lock in alignment therewith and with a channel and means actuating said drum intermittently step by step to bring the channels on the drum successively into register with said locks and means for alternately operating said conveyor.

3. In combination a closed processing chamber, a drum rotatably mounted therein, a series of channels longitudinally thereof, ribs formed on the chamber intersecting all but one of the channels thereby leaving one through channel, an endless conveyor, arms on said conveyor operating in said through channel in spaced relation corresponding to the spacing to said ribs, an inlet lock to said chamber, a boxed opening in an end wall of the chamber, a discharge lock on the other end wall in alignment therewith, a partition in said box, a wheel member in the compartment on one side thereof, the other compartment constituting a housing for one end of the conveyor, an inlet for supplying articles to the wheel, the box and communication through said partition connecting said compartment whereby articles fed to the wheel fall therefrom through the partition to the conveyor, and means actuating said drum intermittently step by step to bring the channels on the drum successively into register with said locks and means for alternately operating said conveyor.

4. In combination a closed processing chamber, a box covering an opening in each end wall, a sprocket in each box, a conveyor mounted on said sprocket, means intermittently operating said conveyor step by step, a drum rotatably mounted in said chamber, ribs on the wall of the chamber extending round said drum and cut away in the vicinity of the conveyor, channels in the drum extending longitudinally thereof intersected by said ribs, arms on the conveyor extending into said channel spaced equally with said ribs, means for feeding articles to the conveyor through one of said boxes and means for discharging articles fed by the conveyor to the other boxes each said means closing the paths of feeding and discharge respectively before and after each feeding and discharging operation and intermittent driving means for the drum actuated alternately with the conveyor operating means.

5. In combination a closed processing chamber, a drum mounted for step by step rotation therein, brackets on said drum arranged to form equal channels longitudinally thereof around the drum, each said step by step movement being equivalent to the width of the channels, ribs on the wall of the chamber intersecting all but one of said channels, thereby leaving one through channel, an endless conveyor, arms for said conveyor, operating in channel wheels for said conveyor external to said chamber at each end thereof, a box for each said wheel covering openings in the end walls of the chamber for said conveyor, horizontal partitions in said boxes, one wheel member below the partition at the feed end and the other above the respective partition at the discharge end, a feed wheel above said partition of the box at the feed end, and a discharge wheel below said partition of the box at the discharge end, a communication between the compartments in each said boxes through the respective partition, each said wheel member closing the path from said processing chamber through said partition, and means for actuating said conveyor step by step equivalent to the spacing of the ribs alternately with the movements of said drum.

6. A closed cylindrical process chamber, a coaxial drum mounted for rotation therein, channels formed longitudinally on the drum between the drum and wall of the chamber, ribs on the chamber wall intersecting all but one of said channels, an endless conveyor located in the cut away portions of said ribs and passing through the end walls of the chamber, arms in the conveyor spaced according to the ribs and extending towards the drum and locks associated with the conveyor as it passes through the end wall permitting the entry and exit of articles to and from the chamber on the conveyor without establishing communication between the interior of the chamber and external atmosphere.

7. A closed cylindrical process chamber, a coaxial drum mounted for rotation therein, channels formed longitudinally on the drum between the drum and wall of the chamber, ribs on the chamber wall intersecting all but one of said channels, an endless conveyor located in the cut away portions of said ribs and passing through the end walls of the chamber, arms in the conveyor spaced according to the ribs and extending towards the drum and locks associated with the conveyor as it passes through the end wall permitting the entry and exit of articles to and from the chamber on the conveyor without establishing communication between the interior of the chamber and external atmosphere, a conduit externally of said chamber connecting said locks whereby a closed path for the conveyor is obtained.

8. A closed cylindrical process chamber, a coaxial drum mounted for rotation therein, channels longitudinally on the drum between the drum and wall of the chamber, ribs on the chamber wall intersecting all but one of said channels, an endless conveyor located in the cut away portions of said ribs, and between the channels and chamber wall, arms on the conveyor spaced according to said ribs and extending towards the drum, said conveyor passing through the end walls of the chamber driving means for the conveyor external to the chamber, locks associated with the conveyor at each end wall, feeding means for the articles through the lock at one end to the conveyor, and discharge means for the articles from the conveyor through the lock at the other end and means for actuating the drum and conveyor step by step alternatively.

9. A closed cylindrical process chamber, a coaxial drum mounted for rotation therein, channels formed longitudinally on the drum between the drum and wall of the chamber, ribs on the chamber wall intersecting all but one of said channels, an endless chain located in the cut away portions of said ribs and passing through the end walls of the chamber, arms on the chain spaced according to the ribs and extending towards the drum, locks associated with the chain at the entry and exit end of the chamber, sprockets for said chain at each end thereof, a housing for each said sprocket integral with said lock respectively, a wheel member in each lock for feeding articles in the lock to the chain at the inlet end and from the chain through the lock at the exit end, said wheels closing the path for gases from said chamber through said locks and means for rotating said drum and moving said conveyor step by step alternately.

10. A closed cylindrical process chamber, a coaxial drum mounted for rotation therein, channels formed longitudinally on the drum between the drum and wall of the chamber, ribs on the chamber wall intersecting all but one of said channels, a chain conveyor located in the cut away portion of said ribs in passing through the end walls of the chamber, arms on the conveyor spaced according to the ribs and extending towards the drum, apertured extensions to the end walls of said chamber, locks associated with the conveyor at the entry and exit end of the chamber secured to said end walls and extensions, sprockets for said conveyor at each end thereof, a housing for said sprocket integral with said lock respectively, a wheel member in each lock for feeding articles in the lock to the conveyor at the inlet end and from the conveyor through the lock at the exit end, said wheels closing the path for gases from said chamber through said locks, and a conduit for said conveyor between said apertured extensions connecting the sprocket housing at the feed end with the sprocket housing at the discharge end of the chamber whereby a closed path for the conveyor obtains and means for rotating said drum and moving said conveyor step by step alternately.

In testimony whereof I affix my signature.

WILLIAM SYDNEY YARROW.